United States Patent [19]
Wen

[11] 4,049,218
[45] Sept. 20, 1977

[54] VERTICAL TAKE OFF AND LANDING AIRCRAFT

[75] Inventor: Lian-Tong Wen, New York, N.Y.

[73] Assignees: Yung-Heng Wang, Cliffside Park, N.J.; Charles Chang, Honolulu, Hawaii ; part interest to each

[21] Appl. No.: 666,467

[22] Filed: Mar. 12, 1976

[51] Int. Cl.² ............................................. B64C 29/00
[52] U.S. Cl. .................................. 244/23 C; 60/269; 239/265.17; 244/12.3
[58] Field of Search ...................... 244/23 C, 12 C, 49, 244/12.2, 23 B, 12.3; 239/265.11, 265.17, 265.19; 60/264, 269

[56] References Cited

U.S. PATENT DOCUMENTS

| | | | |
|---|---|---|---|
| 1,954,437 | 4/1934 | Washburne | 60/269 |
| 2,681,773 | 6/1954 | Rethorst | 244/49 |
| 2,718,364 | 9/1955 | Crabtree | 244/12 C |
| 2,881,989 | 4/1959 | Flettner | 244/49 |
| 2,944,762 | 7/1960 | Lane | 244/12 C |
| 3,124,323 | 3/1964 | Frost | 244/12 C |
| 3,371,886 | 3/1968 | Schertz | 244/49 |
| 3,599,901 | 8/1971 | Relkin | 244/12.3 |
| 3,915,411 | 10/1975 | Surbaugh | 244/12 C |

Primary Examiner—Stephen G. Kunin
Assistant Examiner—Charles E. Frankfort
Attorney, Agent, or Firm—Curtis, Morris & Safford

[57] ABSTRACT

A method and apparatus to improve the performance of a Vertical Take Off and Landing (VTOL) aircraft having increased safety, efficiency and maneuverability is described. The utilization of an airbooster to achieve optimum air speed of jetted air, have made the increase in its efficiency feasible. A concealed rotor eliminates the great hazard of most VTOL.

5 Claims, 6 Drawing Figures

VERTICAL TAKE OFF AND LANDING AIRCRAFT

FIELD OF THE INVENTION

This invention relates generally to the construction of aircraft for vertical take off and landing and more particularly to simpler and smaller aircraft for its simplicity and safety of handling in the air as well as on the ground and of approaching the ability to be used as a car. The ability of the aircraft structure to utilize the boosting effect of the airstream and the flexibility to adjust the jet speed for better lift, have made this invention most prominent of all.

THE PHENOMENON OF DIRECT ASCENT LIFTING ABILITY

The phenomenon of lifting ability of a VTOL does not depend entirely on the speed of a jetting stream. The speediest jet of a jet engine, efficiency wise, does not provide highest lift ability. On the contrary, the slower jets of a propeller wing such as that used in a helicopter, provide a much better lift. The choice of jetting speed is therefore an important factor. This invention provides the flexibility for the VTOL to be designed for any jet speed for best efficiency.

THE BACKGROUND AND OBJECT OF THIS INVENTION

The present invention relates to vertical take off and landing aircraft, more particularly to apparatus and methods to actuate or maneuver the aircraft. There are numerous ways to actuate the VTOL, but none has been considered satisfactory either in its maneuverability or in its efficiency as well as safety in handling.

In general the lifting ability of a jet engine is a simple and powerful enough a device for the VTOL, but the loss of efficiency due to too high a jet speed and its disturbances while taking off, such as erosion and others, make it unfavorable.

Though the rotary wing of a helicopter, due to its better lifting ability, is the choice over the jet powered ones, it has the disadvantages of operating cost and the hazards inherent in a rotary wing.

The present invention provides an apparatus for avoiding excessive speed and a concealed rotor to free from all hazards in its handling.

Since the rotor is concealed, there is no danger of major proportion should it touch or hit something in a crowded landing area. It thus makes it possible for the aircraft to be operated in a much smaller space than a helicopter, which is much to be desired in the operation of VTOL.

Due to the feasibility of this invention to make aircraft smaller and the possibility to retract its frontal area, it is made possible for the aircraft to be driven on the street or the highway, like a car — a flying car as it may be called.

BRIEF DESCRIPTION OF THE DRAWING

For fuller understanding of the method and procedures by which the objects of this invention are achieved, reference should be made to the following descriptions taken in connection with the accompanying drawing in which.

DETAIL DESCRIPTION OF THE DRAWINGS

In the figures, the same number denotes the same part through out.

Figure 1:
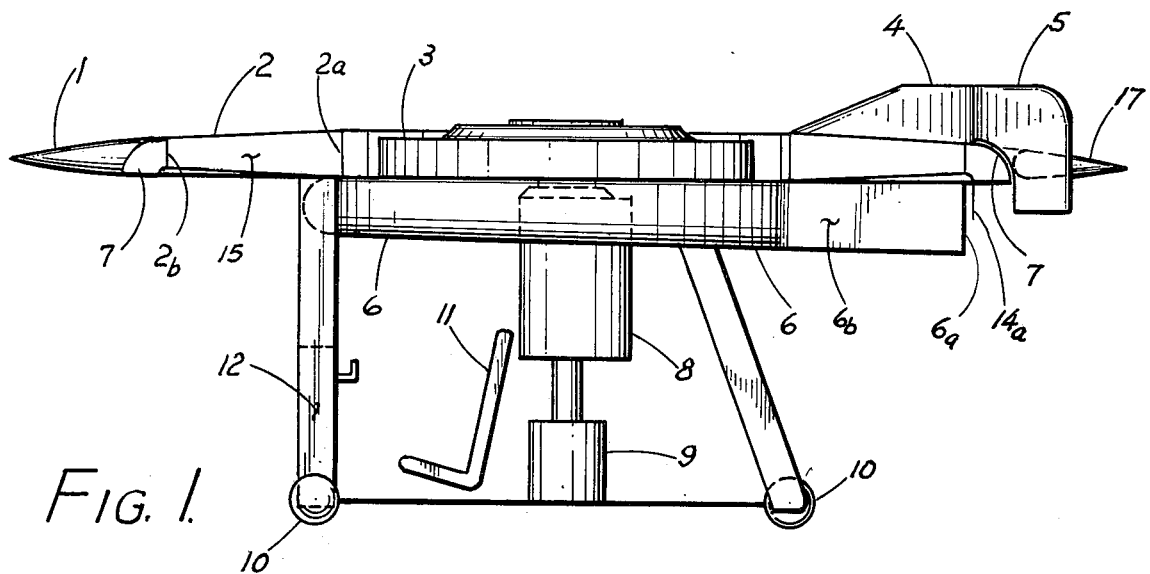
FIG. 1 is the side view and a partial section of a VTOL, showing a preferred configuration and installation to achieve the object of this invention.

In FIG. 1, 1 is an annular wing of the aircraft. 2 is the annular airstream guide housing or airbooster, $2_a$ is an air-entrance or air-inlet for the annular housing 2, $2_b$ is the exhaust of same and 15 are partitions in the booster housing. 3 is the impeller or rotor to propel air centrifugally. 4 is the fin of the aircraft, 5 is the rudder for directional control during flight, 17 is the elevator, 6 is a circular collecting manifold, $6_b$ is a blower and $6_a$ is the blower exhaust. 7 is an annular deflector to deflect outwardly streaming air downwardly to convert it into lifting force. The aircraft is provided with an engine or power source 8, means 9 to actuate the up and down position of the engine, wheels 10, a chair 11 for the pilot and a control box 12 where all controls are assembled, as well known in the art. $14_a$ is a pair of vanes to deflect the downward airstream as will be described later.

Figure 2:
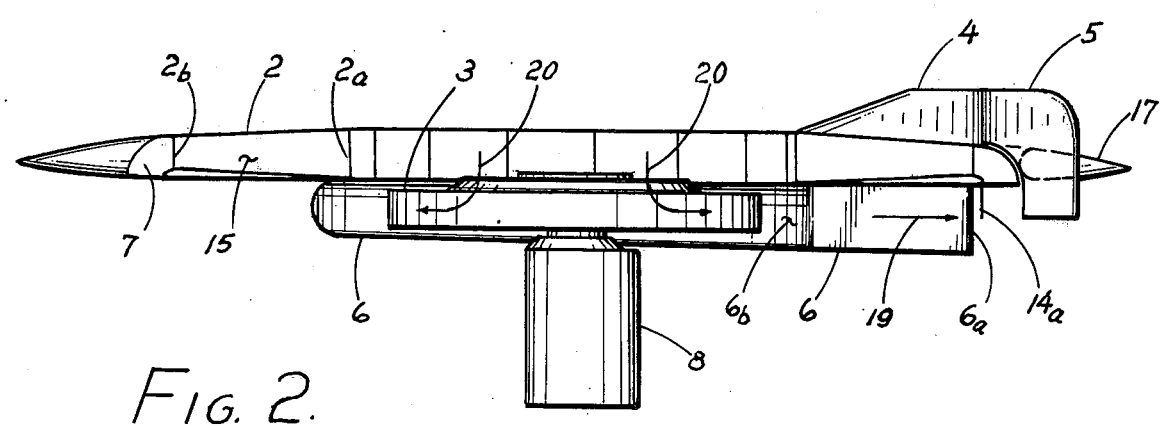
FIG. 2 is a partial sectional view taken through center line 3—3 of FIG. 3, showing the location of the blower or impeller while in flight.
Figure 3:
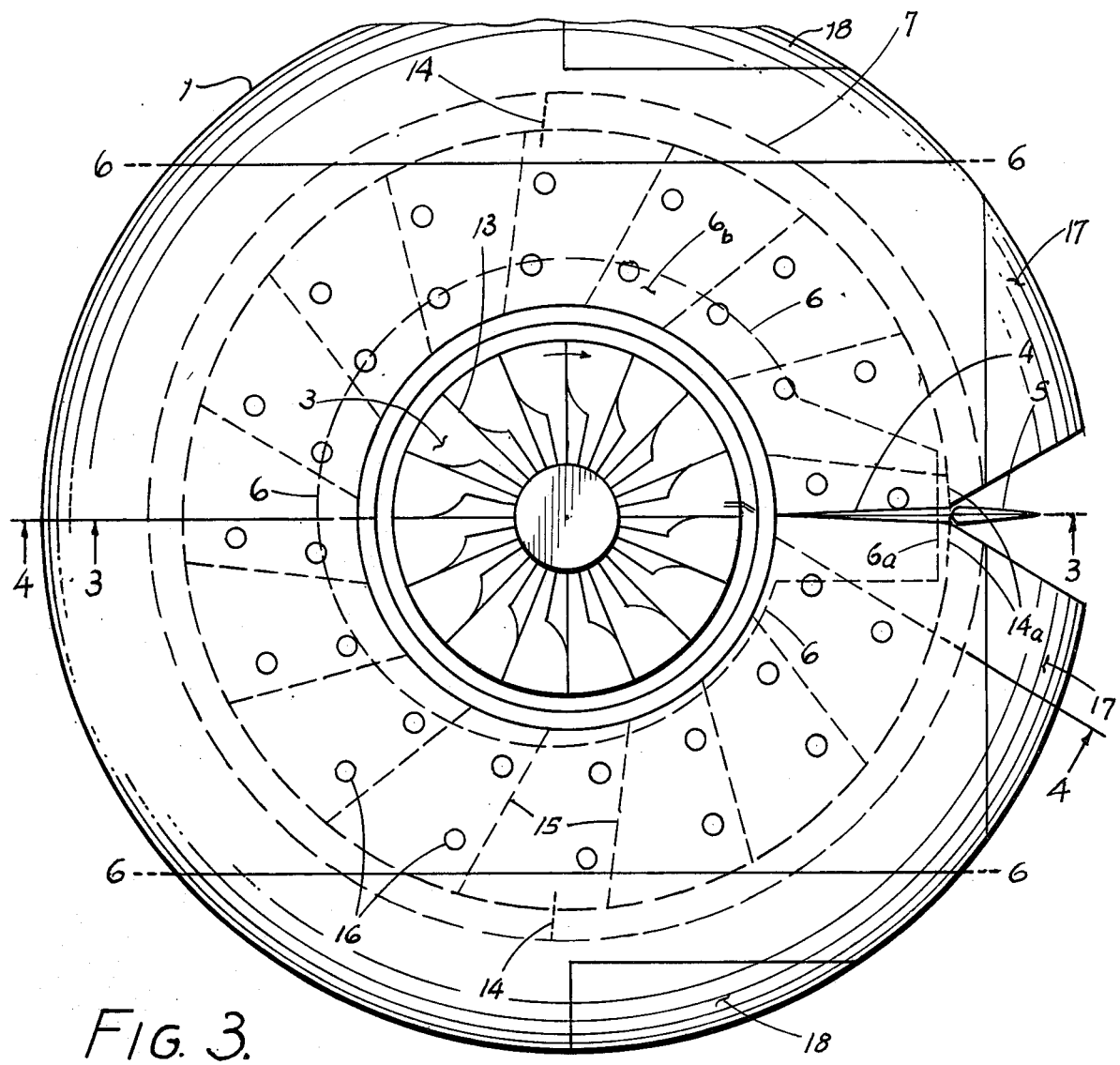
FIG. 3 is the plan view of the aircraft showing the preferred configuration and installation of this invention.

FIG. 2 is a partial sectional view of the aircraft taken through the center line 3—3 of FIG. 3, showing the location of the impeller 3 and the collecting manifold 6. When the impeller is in action, the collecting manifold 6 will collect all the air-expelled by the impeller and exhaust it through exhaust $6_a$ to push the aircraft forward.

In FIG. 3, 3 is the impeller or rotor, 13 is one of the many impeller blades which propel air radially outwards. Vanes or baffles 14 are located on right and left sides of the wing, they are attached at the top of the annular airstream guide housing 2 and they can be maneuvered to swing forwards or backwards to deflect the direction of the airstream and impart horizontal components to the airstream leaving annular deflector 7. This airstream in turn will actuate the aircraft. The ribs or partitions 15 of the booster housing 2 guide the streaming air towards the deflector. These partitions 15 are aligned in the natural direction of the propelled airflow in order to remove or reduce any resistance or turbulence. Openings 16 on the top of the annular booster housing 2 allow air to be sucked in by the effect of the streaming air inside the housing. A pair of horizontal elevators 17 is provided to control the aircraft in flight and a pair of ailerons 18 is provided for lateral control in flight.

Figure 4:
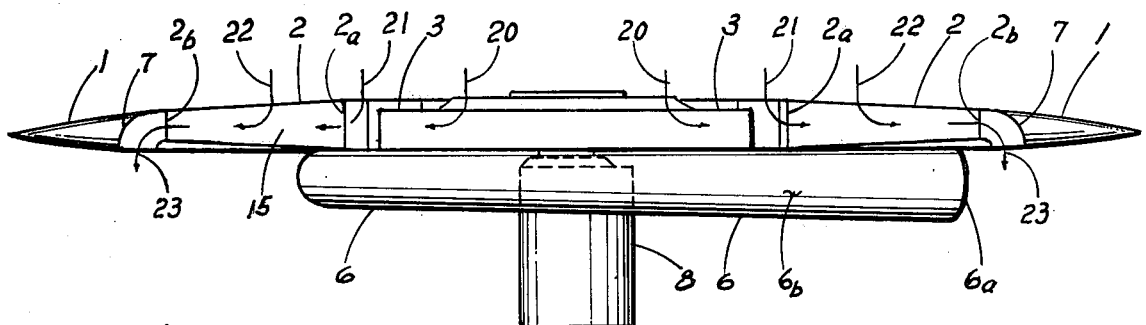
FIG. 4 is the partial sectional view taken through line 4—4 of FIG. 3 showing the location of the blower or impeller while hovering and its airflows.

FIG. 4 is a partial sectional view of the aircraft taken through line 4—4 of FIG. 3. FIG. 4 shows the impeller or rotor 3 in an ascent or hovering position. The impeller may be a simple one or a mixed-flow impeller. 20 is the airstream drawn in by the impeller and is expelled radially through airstream guide 2 to be deflected by deflector 7 downwards as is indicated by airflow 23. Airflow 21 is an additional airmass drawn in or induced by the speeding flow 20. The wider entrance $2a$ of the booster housing 2 is to facilitate the additional air to get into the booster. 22 is another additional airmass drawn in through openings 16 provided at the top of the booster. 22 is induced by the negative pressure generated by the speeding airstream inside the booster. With the provision of the booster, extra airmasses 21 and 22 are added to the lifting airmass 20 for a better lift. The airstream guide housing is also called a booster because it acts like a round booster of a rocket or a duct of a ducted propeller which draws additional air into the system to boost their lifting power.

Figure 5:
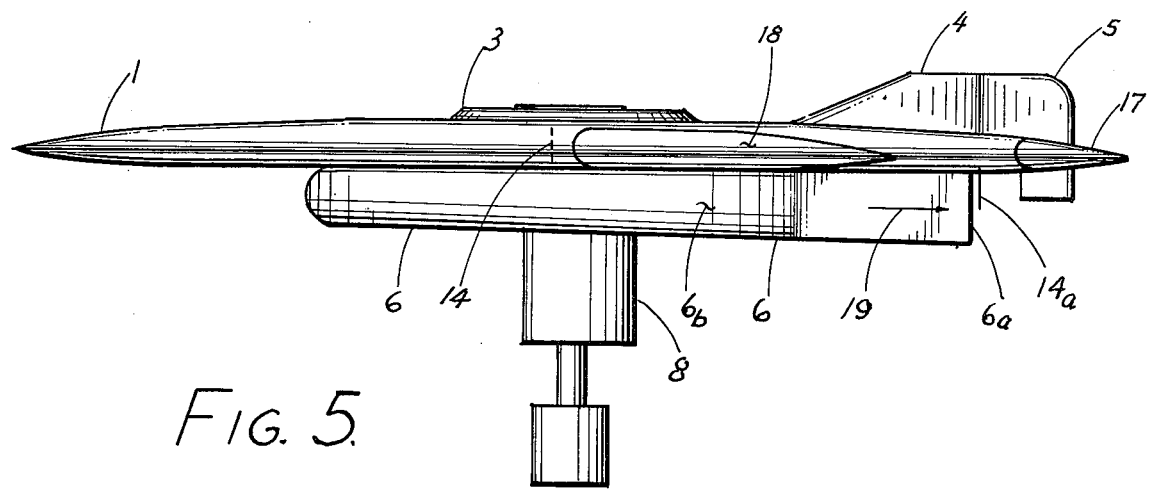
FIG. 5 is the side view of the aircraft showing its controls: rudder, elevator and aileron.

In FIGS. 5, 17 is the elevator, 18 is the aileron and 14 is the vane to deflect the downward airstream backwards or forwards to actuate the turning of the aircraft while on the ground or hovering in the air. $14_a$ are a pair of vanes located at the rear end of the aircraft and attached swingably to the inner rim of the deflector 7. When the vanes are made to swing to the back they will deflect a column of downwardly streaming air from the deflector rearwards to produce a forward thrust to move the aircraft, while it is on the ground for taxing or to assist the initial forward thrust while hovering.

Rudder 5 is hooked down partially into the path of streaming exhaust $6_a$ in order to have better efficiency and sensitivity when it is actuated by the jetting air while in flight. And while the aircraft is taxing on the ground using the power of exhaust $6_a$, this rudder is a means for steering. However, a steering machanism should be built for convenience.

Figure 6:
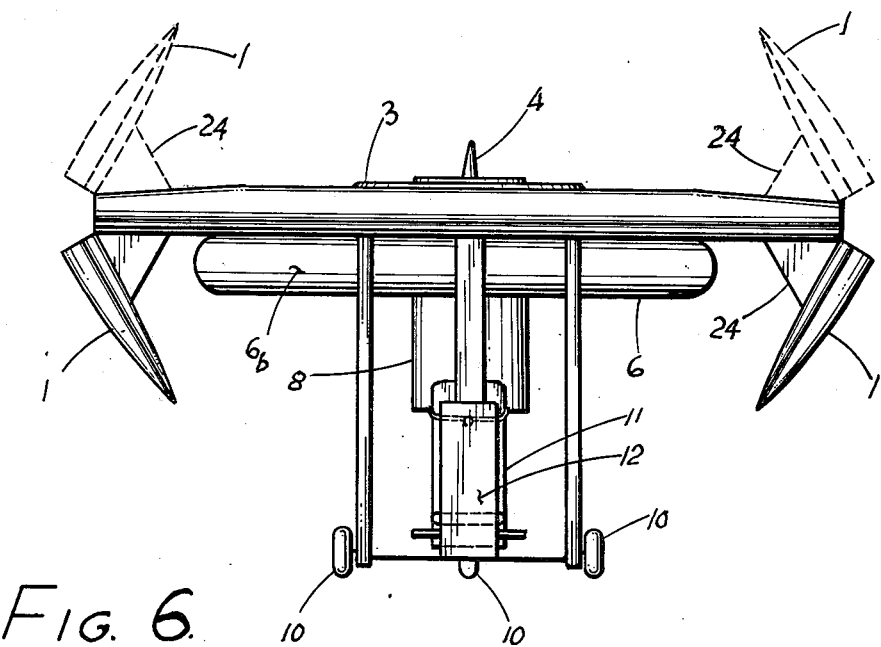
FIG. 6 is a frontal view of the aircraft with portions of its two wing tips turned downward, through lines 6—6 of FIG. 3 to reduce its frontal area of the aircraft for the convenience of moving in a crowded area while on ground. It may also be turned upwards as shown in dotted lines, to suit the requirement.

FIG. 6 is a frontal view of the aircraft, with its right and left wing tips turned downward through lines 6—6 of FIG. 3. Their folding down has retracted the frontal area greatly so that it may be driven on the street or highway resembles a car. 24 indicates means to secure the retracted part while driving.

PHENOMENON OF A BOOSTER

The earlier stage of rockets for carrying missiles were mostly equipped with a booster pipe in order to increase their thrust and added range. And the much used ducted or shrouded propeller is known to have added greatly to its lifting force. It is the natural character or phenomenon of a speeding jet or streaming flow of air or gases, that it tends to slim its size down as it is jetting out of a nozzle. The provision of the booster for jetting gas and the provision of a duct for a propeller are to restrain the jetting stream from thinning down. This restraining effect has produced a negative pressure at the entrance of the booster or the duct. This negative pressure will thus draw in free air around it to add to the streaming airmass to booster the lifting force.

Besides, it is a well known phenomenon that the passing of a speeding air flow will also pickup the air adjacent to the flow to add to the speeding airmass. The ability for this configuration to utilize these two phenomena is a great contribution to this invention.

EMBODIMENTS

The main purpose of this invention is to provide an aircraft with highest safety, better efficiency and maneuverability. The drawings depict the configuration and arrangement of parts which makes it possible. The enclosed impeller has not only totally eliminated the hazard of a common helicopter, it has also rendered the arrangement to utilize the effect of a booster as well as the flexibility to utilize the best jetting speed for a better lift.

FIG. 4 illustrates that when the impeller rotates, it expels airstream 20 radially into booster housing 2 through booster housing entrance $2_a$ and streaming straight down towards the deflector 7 to be converted into lift and while the airstream 20 is passing through the gap between the impeller tip and entrance $2_a$ of the booster housing 2, the boosting effect induced by the airstream 20 will draw in airstream 21 into the system. Again the openings 16 on the top of the booster housing will also admit airstream 22 induced also by the streaming effect of the air streaming inside the booster. The airstreams 21 and 22 drawn in by the boosting effect of the booster housing 2 contributes greatly to the efficiency of the lifting power.

The wider entrance of $2_a$ and narrower exhaust $2_b$ of the housing 2 is to compensate for the natural flaring of volume, due to the difference in diameters, in order to maintain its desirable air speed. This provision is most desirable because the airstream speed may then be adjusted as desired for best performance. The length (or its annular width) of the booster housing may also be varied to its best advantage because the length of the booster housing may affect the speed of the airstream and the efficiency of the booster.

The space or gap between the impeller tip and booster entrance may be varied to suit the best boosting effect. The location size and shape of openings 16 may also be varied to suit requirements.

While the aricraft is on the ground or hovering, the maneuvering of the aircraft depends entirely on baffles and vanes 14 and $14_a$. The pair of baffles 14 may be connected in such a way so that when the left baffle is deflecting the airstream backwards, the right baffle will be deflecting the airstream forwards in opposite direction. It will thus turn the aircraft in a clockwise rotation. Vice versa the aircraft will be turned counter clockwise. There is only a pair of baffles 14 shown, but more may be provided if needed. These baffles may also be made to move in the same direction so that both deflect the streaming air in the same direction in order to move the aircraft forwards or backwards instead of rotating the aircraft.

Vanes $14_a$ are provided to move the aircraft forwards to add to the capability of baffles 14 while the aircraft is on the ground or while hovering. However, at the very beginning of the forward thrust of the aircraft, both 14 and $14_a$ may provide the much needed initial thrust they can furnish before the thrust of the blower takes over.

IN OPERATION

In operation the rotor or impeller 3 is to be in the upper position as shown in FIG. 1. When the impeller rotates, it draws in air 20 from the top and expells it radially into airstream guide housing 2, or the booster, as shown in FIG. 4. Airstream 20 will go through airstream guide housing 2 and is deflected down by deflector 7 to convert into lifting force to lift the aircraft.

In due process additional airstream 21 is drawn in through booster entrance $2_a$ and additional airstream 22 is drawn in through openings 16 at the top of the booster housing, both being due to the effect of the jetting air 20, to add to the lifting airmass for more lift. At this instant the aircraft is in an ascent or hovering attitude.

The impeller 3 should be provided with more power than is needed for the ascent of the aircraft so that part of the excess power can be used during the transitional period. As the aircraft is ascending or hovering the rotating impeller may be retracted partially into the collecting manifold 6 so that part of the expelled airstream will be exhausted to the rear through exhaust $6_a$ as a thrust to push the aircraft forward. When the forward speed of the aircraft is increased, the lifting power of the annular wing 1 will start to take over the lift. And when the speed of the aircraft is such that the total lift is borne by the wing, the impeller can then be made to go all way down in the collecting manifold 6 so that all the expelled air is exhausted through $6_a$ to the rear for a full thrust of the aircraft to attain full speed. The aircraft is then in its full flight.

When the impeller is all way down and full thrust is coming out of the exhaust $6_a$, vane $14_a$ will automatically swing all way up covering the deflector, since there is no air coming out of the deflector at this moment. Therefore vane $14_a$ present no obstruction to the exhaust flow 19 delivered by the impeller.

For a landing, the impeller is raised to its upper position as shown in FIG. 1. The forward thrust will then be reduced to zero and the aircraft will be in its hovering attitude. Then by reducing the speed of the impeller gradually, the lifting force will also diminish and the aircraft decends gradually to a landing. During hovering or landing, baffles and vanes 14 and $14_a$ will take over the orientation of aircraft.

Due to the enclosed impeller and its arrangement of parts, the aircraft may even be touched or handled while taking off or while making a landing. The facts that no hazard could happen even it is landed in a crowded area, has made the aircraft the most favorable VTOL for all kinds of operations. Its ability to be driven on the street or highway makes it a flying car, and its saucer like appearance makes it a flying saucer.

The configuration of the aircraft shown is only a preferred example to illustrate how the devices can be installed and to clearly demonstrate and describe how they will function. It is understood that any changes or deviations on each part shown may be made without departing from the spirit of this invention. Further, where specific terminology is utilized or specific devices are mentioned, it is understood that the invention is not restricted to such terms or devices, but that all useful equivalents of such terms and devices suitable for the purpose of this invention are intended or included thereby.

What is claimed is:

1. An aircraft comprising
   an annular wing capable of supporting the aircraft in horizontal flight,
   a centrally located impeller having a substantially vertical axis of rotation,
   means for moving said impeller axially between an upper position and a lower position,
   an annular airstream guide housing within said annular wing and surrounding the periphery of the impeller for receiving air discharged radially from the impeller when the impeller is in the upper position, said airstream guide housing having an annular deflector spaced outwardly from the periphery of the impeller for deflecting downwardly the radially discharged air to provide lift for the aircraft, and
   a collecting manifold under said housing and surrounding the periphery of the impeller for receiving air discharged radially from the impeller when the impeller is in the lower position, said manifold having a rearwardly facing exhaust port for discharging air from the manifold to provide forward thrust for the aircraft.

2. An aircraft as defined in claim 1 in which the airstream guide housing is provided with movable baffles for selectively imparting a horizontal component to the radially discharged air deflected downwardly by the annular deflector.

3. An aircraft as defined in claim 1 in which a portion of the deflector at the rear of the aircraft is provided with swingable vane for selectively redeflecting a column of downwardly streaming air rearwardly to provide forward thrust.

4. An aircraft as defined in claim 1 in which the airstream guide housing is provided with spaced openings intermediate the periphery of the impeller and the annular deflector for augmenting the mass of the air stream moving radially from the impeller to the deflector.

5. An aircraft comprising
   an annular wing capable of supporting the aircraft in horizontal flight,
   a centrally located impeller having a substantially vertical axis of rotation,
   means for moving said impeller axially between an upper position and a lower position,
   an annular airstream guide housing within said annular wing and surrounding the periphery of the impeller for receiving air discharged radially from the impeller when the impeller is in the upper position, said airstream guide housing having an annular deflector spaced outwardly from the periphery of the impeller for deflecting downwardly the radially discharged air to provide lift for the aircraft, spaced openings intermediate the periphery of the impeller and the annular deflector for augmenting the mass of the airstream moving radially from the impeller to the deflector and movable baffles for selectively imparting horizontal components to the radially discharged air deflected downwardly by the annular deflector, a portion of the annular deflector at the rear of the aircraft being provided with swingable vanes for selectively redeflecting a column of downwardly streaming air rearwardly to provide forward thrust,
   a collecting manifold under said housing and surrounding the periphery of the impeller for receiving air discharged radially from the impeller when the impeller is in the lower position, said manifold having a rearwardly facing exhaust port for discharging air from the manifold to provide forward thrust for the aircraft.

* * * * *